United States Patent [19]

Watson

[11] Patent Number: 4,853,206

[45] Date of Patent: Aug. 1, 1989

[54] TREATMENT OF WASTE MATERIAL

[75] Inventor: Richard W. Watson, 1 Woodlands Grove, Ilkley, West Yorkshire LS29 9BX, United Kingdom

[73] Assignee: The BOC Group plc, Windlesham, United Kingdom

[21] Appl. No.: 45,973

[22] Filed: May 1, 1987

[30] Foreign Application Priority Data

May 2, 1986 [GB] United Kingdom ................. 8610856

[51] Int. Cl.$^4$ ...................... C01B 17/52; C01B 17/50
[52] U.S. Cl. .................................... 423/542; 423/540; 423/242
[58] Field of Search ............... 423/542, 242 A, 242 R, 423/540

[56] References Cited

U.S. PATENT DOCUMENTS

| | | | |
|---|---|---|---|
| 2,452,517 | 10/1948 | Broughton | 423/542 |
| 3,501,270 | 3/1970 | Dieters | 423/242 |
| 3,645,683 | 2/1972 | Isbell, Jr. | 23/111 |
| 3,795,731 | 3/1974 | Furkert | 423/351 |
| 3,944,657 | 3/1976 | Furkert | 423/541.4 |
| 3,950,502 | 4/1976 | Furkert | 423/541 A |
| 4,010,246 | 3/1977 | Steinrotter et al. | 423/542 |
| 4,054,562 | 10/1977 | Furkert | 260/239.3 |
| 4,256,721 | 3/1981 | Blakey et al. | 423/540 |
| 4,347,225 | 8/1982 | Audeh et al. | 423/542 |
| 4,347,226 | 8/1982 | Audeh et al. | 423/542 |

FOREIGN PATENT DOCUMENTS

| | | |
|---|---|---|
| 0071078 | 2/1983 | European Pat. Off. ............ 423/542 |
| 7204117 | of 1972 | France . |
| 7220559 | of 1972 | France . |
| 578374 | of 1946 | United Kingdom . |
| 1017661 | of 1966 | United Kingdom . |
| 1033235 | of 1966 | United Kingdom . |
| 1092171 | of 1967 | United Kingdom . |
| 1288851 | of 1972 | United Kingdom . |
| 1395920 | of 1975 | United Kingdom . |
| 1407161 | of 1975 | United Kingdom . |
| 1430786 | of 1976 | United Kingdom . |
| 1462925 | of 1977 | United Kingdom . |
| 1527661 | of 1978 | United Kingdom . |
| 1567098 | of 1980 | United Kingdom . |
| 1602621 | of 1981 | United Kingdom . |

Primary Examiner—Gregory A. Heller
Attorney, Agent, or Firm—David A. Draegert; Larry R. Cassett

[57] ABSTRACT

A gas mixture including sulphur dioxide is recovered from sulphate waste material by burning a fuel to form a flame zone, introducing sulphate waste material into the zone and introducing pure oxygen or other oxygen-rich gas into the flame zone to support combustion of the fuel and to generate a flame of sufficient temperature to crack solid sulphate waste material and thereby liberate sulphur dioxide therefrom. Solids exiting the flame zone are separated from the gaseous combustion products. The sulphate waste material may be taken from a plant for making titanium dioxide pigment by the sulphate route.

5 Claims, 2 Drawing Sheets

TREATMENT OF WASTE MATERIAL

BACKGROUND TO THE INVENTION

This invention relates to a method of apparatus for treatment of waste materials. It is particularly concerned with the treatment of "Sulphate Waste Material". By the term "Sulphate Waste Material" as used herein we mean waste material comprising sulphuric acid and/or a sulphate (typically an inorganic sulphate). Examples of such sulphate waste material include petroleum refinery sludge, spent pickling liquor and other wastes from chemical or metallurgical processes in which sulphuric acid is employed.

One particular example with which this invention is concerned is the sulphate waste material that is typically obtained in the manufacture of titanium dioxide pigments by the sulphate route. The sulphate waste material from this process particularly comprises relatively dilute sulphuric acid including dissolved iron sulphate. Typically, such sulphate waste includes from 14 to 20% by weight of sulphuric acid and up to 20% by weight of iron sulphate may be included, and typically traces of other inorganic sulphates, the balance being water.

It has been proposed to treat this waste material by subjecting it to spray drying whereby to remove the water without liberating a substantial amount of sulphur dioxide. The resultant anhydrous sulphate salts are then removed from the acid and the acid is recondensed at a higher strength. One disadvantage of this method is that it requires relatively complex spray drying equipment and the spray drying stage is difficult to optimise. A second and more fundamental disadvantage is that in the event that the waste material includes metal ions that may have a deleterious effect on the titanium dioxide pigment, such metal ions may be carried with the acid vapour with the result that the resulting concentrated sulphuric acid may not be of sufficient purity for reuse in the manufacture of titanium dioxide.

In our UK patent application 2181120A we disclose a process for the treatment of sulphate waste material that includes a significant proportion of inorganic sulphate in which the sulphate waste material may be cracked in a rotary or other kiln or in a fluidised bed. In the fluidised bed, an oxygen-rich gas such as pure oxygen or oxygen-enriched air is preferably employed to fluidise the bed, and a solid fuel such as coke may be burned to raise the temperature necessary to crack the sulphate waste material fed into the bed. With this method the oxygen-rich gas typically fulfils two functions. The first function is that of providing the necessary oxygen for burning the fuel and thereby generating a temperature sufficiently high to effect the thermal cracking of the sulphate. The second function is to fluidise the bed. Although in some examples, it is perfectly possible for the oxygen-rich gas to fulfil both these functions, it is to be appreciated that if undesirably high levels of residual oxygen are to be avoided in the gas leaving the fluidised bed, in other examples it will be necessary for the oxygen-rich gas to contain a relatively high proportion of nitrogen so as to obtain an adequate fluidising velocity and a stage may be reached where the proportion of nitrogen becomes so high that it is no longer possible to obtain the optimum temperature for thermal cracking or the overall requirements for thermal energy become undesirably high.

The invention relates to an alternative method and apparatus that overcomes or reduces these problems.

SUMMARY OF THE INVENTION

According to the invention there is provided a method of recovering from sulphate waste material (as herein before defined) a gas mixture including sulphur dioxide, comprising burning a fuel to form a flame zone, introducing sulphate waste material into the flame zone, employing oxygen-rich gas (as hereinafter defined) to support combustion of the fuel and to generate a flame of sufficient temperature to crack said sulphate waste material and thereby liberate sulphur dioxide therefrom, and separating solids exiting the flame zone from the gaseous combustion products.

The invention also provides apparatus for use in performing such method, comprising a burner having a first inlet for fuel and a second inlet for oxygen-rich gas (as hereinafter defined), a chamber into which, in use, said burner fires, means for introducing sulphate waste material into the flame zone, an outlet for gaseous combustion products, and means for collecting solid particulate residue emanating from the flame zone of the burner.

By the term oxygen-rich gas as used herein, we mean oxygen-enriched air or pure oxygen itself. Preferably, pure oxygen is employed to support combustion of the fuel. By the use of pure oxygen, notwithstanding the endothermic nature of both the thermal cracking of sulphate and the dehydration and evaporation of the sulphuric acid and waste present, it is possible to maintain an adequate temperature for the thermal cracking to proceed. Preferably said temperature is in the range 900° to 1,300° C.

The burner is preferably disposed vertically or at an angle to the vertical whereby the particles fall under gravity from the flame zone and collect at the bottom of the chamber. The outlet for the residue may typically have a rotary valve and may, if desired, be provided with cooling means to control the temperature.

If desired, the chamber may have a cyclonic particle separator associated with its outlet for gaseous combustion products.

In the event that the solid residue from the thermal cracking is substantially free of sulphate, the gaseous combustion products downstream of any cyclonic separator may be subjected to the necessary cleaning and water removal to make them suitable for use as a feed gas to a plant for producing sulphur dioxide by the contact process. In the event that the concentration of sulphur dioxide in the gas mixture after clean up and removal of water vapour is higher than that normally encountered in the contact process, the gas mixture may be diluted with air.

An alternative method is to employ the kind of contact process described and claimed in our co-pending application 8524083 in which the gas mixture after drying contains at least 30% by volume of carbon dioxide and more than 16% by volume of sulphur dioxide. In this process the dried gas mixture is subjected to a plurality of steps of catalytic conversion to convert sulphur dioxide in the mixture to sulphur trioxide. The temperature of the gas mixture upstream of each stage is adjusted and is the mole ratio of sulphur dioxide to oxygen in the gas mixture upstream of the first stage and intermediate the first and second stages, the mole ratio being adjusted by the addition of oxygen-rich gas to the gas mixture. The resulting sulphur trioxide is then absorbed to form sulphuric acid.

In the event that the residue from the flame zone still contains sulphate, the residue and combustion gases are preferably passed into a fluidised bed or turbulent phase reactor and the combustion gases are employed to heat the particles of solid residue to yield more sulphur dioxide. Typically, the heat content of the combustion gases will be sufficient to complete the cracking of the sulphate. In the event that the gases do not have this necessary heat content, they may be premixed with hot combustion gases from a supplementary burner. Whereas the liquid or gaseous fuel supplied to the main burner is preferably a hydrocarbon, if desired, sulphur may alternatively be burned in the supplementary burner. Such combustion of sulphur has additional benefit in increasing the sulphuric acid output of a downstream plant for producing sulphuric acid by the contact process and may be particularly useful where the sulphur content of the sulphate waste material does not meet the requirements for sulphuric acid of the process from which the sulphate waste material is taken.

Downstream of the fluidised bed reactor, the combustion gases from said flame zone are preferably passed through a separator adapted to remove solid particles elutriating from the fluidised bed, and the gases may then be treated in a conventional precipitator and driers prior to being converted to sulphur trioxide by the contact process.

In another example of the method and apparatus according to the invention, the solid residue from the burner falls under gravity into a treatment region which is preferably located in the same vessel as that into which the burner fires. The residue is then preferably heated by the hot gases from an auxiliary burner so as to crack residual sulphate. The hot gas from the auxiliary burner preferably fluidise or render the residue turbulent. This example is advantageous in the event that the sulphate waste contains a component such as manganese sulphate that tends to melt in the burner flame.

The sulphate waste material is preferably concentrated upstream of the burner by evaporating part of its water content, but without any cracking of sulphate taking place at this stage.

BRIEF DESCRIPTION OF THE DRAWINGS

The method and apparatus according to the invention will be described by way of example with reference to the accompanying drawings, in which.

DETAILED DESCRIPTION

Figure 1:
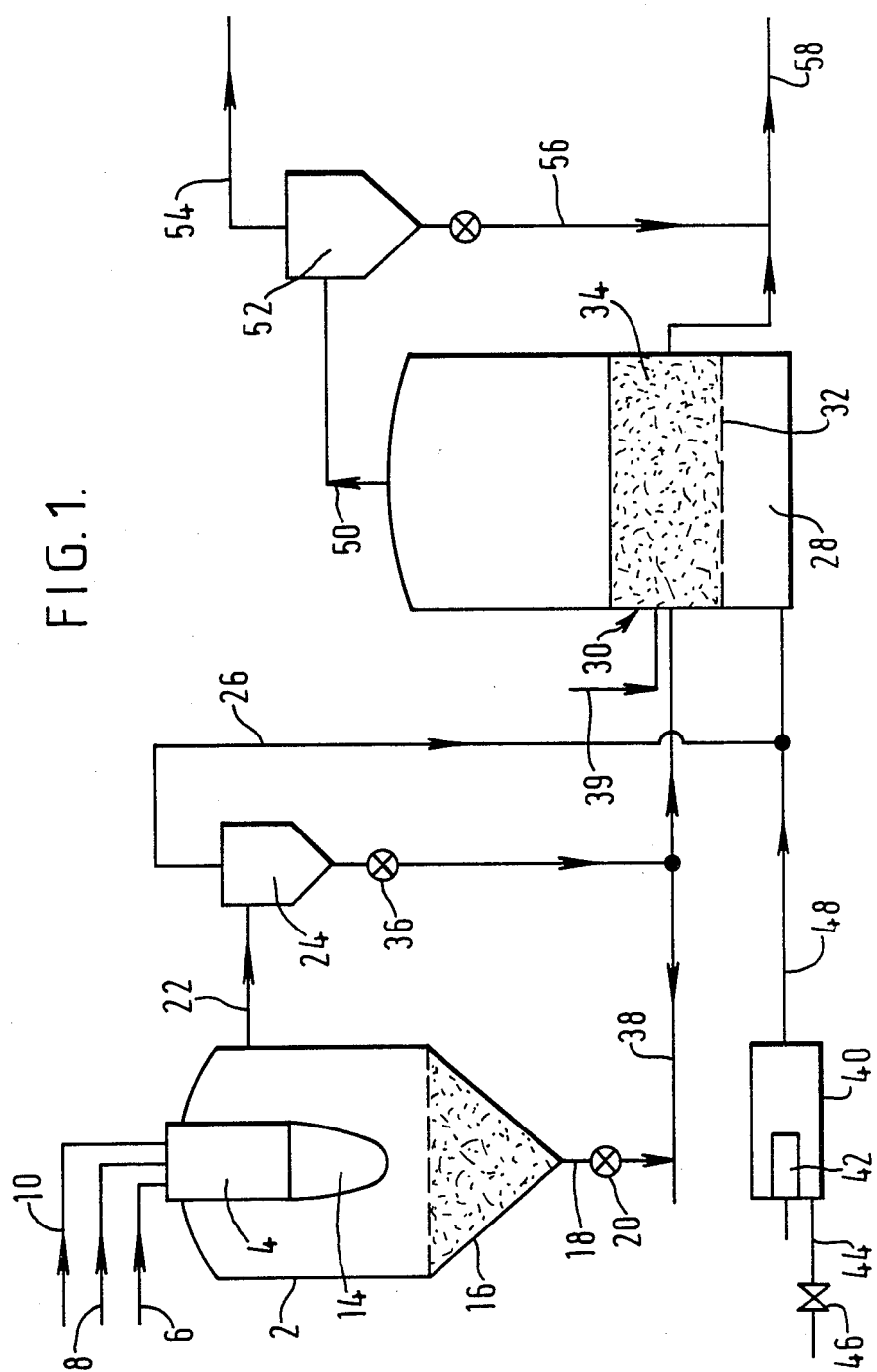
FIG. 1 is a schematic circuit diagram showing one plant for performing the invention and FIG. 2 is a schematic circuit diagram showing an alternative plant for performing the invention.

Referring to FIG. 1 of the drawings, a generally symmetrical combustion chamber 2 is disposed with the longitudinal axis vertical and has extending through its top an axial burner 4. The burner 4 has a first inlet 6 for sulphate waste material from a process for forming a titanium dioxide pigment by the sulphate route, a second inlet 8 for commercially pure oxygen and a third inlet 10 for gaseous or liquid hydrocarbon fuel.

In operation, a flame zone 14 is created which extends generally vertically downwards within the chamber 2 and ends above a lower conical portion 16 of the chamber 2. At the bottom of the conical portion 16, the chamber 2 has a first outlet 18. A rotary valve 20 is disposed in outlet 18. The chamber 2 has a second outlet 22 near its top. The outlet 22 communicates with a cyclonic solids separator 24 having at its top an outlet communicating with a pipeline 26 that leads to a plenum chamber 28 of a fluidised bed reactor 30 having a grid 32 forming the top of the chamber 28 and supporting a bed 34 of particulate materials. The separator 24 has a bottom outlet with a rotary valve 36 disposed therein, the outlet communicating with a conduit 38 which at one of its ends terminates in the outlet 18 from the chamber 2 and at its upper and terminates in the bed 34. By this means, in operation, a residue of solid particles of oxide and sulphate may be fed into the bed 34 and be fluidised by gas passing from the outlet 22 of the chamber 2 via the separator 24 and conduit 2. The hot gas will also serve to crack thermally the residue sulphate.

The apparatus preferably includes an auxiliary combustion chamber 40 having a fuel burner 42 disposed therein. The chamber 40 has an outlet communicating with a conduit 48 for combustion gases which terminates in the conduit 26. If desired, the temperature in the chamber 40 may be controlled by the addition of cooling medium such as colled gas from a downstream location in the process (in which example a recycle fan is issued) or water or steam. The coolant may be introduced through a conduit 44 having a flow control valve 46 disposed therein or directly through the burner 42.

The reactor 30 has an outlet 50 at its top communicating with a cyclonic separator 52 adapted to separate elutriating solids from the gas mixture. The separator 52 has an outlet 54 for gas at its top and an outlet 56 at its bottom for discharging separated solids.

In operation, hydrocarbon fuel such as methane or propane or fuel oil is burnt with a slight stoichiometric excess of oxygen in the burner 4 and is employed to crack the sulphate waste comprising sulphuric acid and iron sulphate. The rate of feeding the sulphate waste into the flame zone 14 from the inlet 6 is chosen such that the gases leaving the chamber 2 through the outlet 22 have a temperature not less than 1,000° C. and preferably in the range 1,000° to 1,300° C. In the flame zone 14 the temperature generated by the combustion of the fuel firstly evaporates the sulphate waste material, secondly drives off water of crystallisation from the solid particles of sulphate that result from the vaporisation, and thirdly cracks the sulphate and sulphuric acid to form sulphur dioxide. The gas mixture leaving the outlet 22 thus comprises water vapour sulphur dioxide and carbon dioxide. It may also contain small traces of sulphur trioxide and typically from 1% to 5% by volume of oxygen. Typically, the gas mixture contains up to 14% by volume of sulphur dioxide if the water vapour is excluded.

The cracking of the solid sulphate can in some examples be completed in the zone 14 but is typically not completed in the zone 14. A solid residue comprising particles of oxide and sulphate thus falls under gravity to the bottom of the chamber 2 being collected in the conical portion 16. Operation of the rotary valve 20 is effective to feed these particles into the bed 34 of the fluidised bed reactor 30. If desired, iron sulphate heptahydrate crystals that have been separated from the reacting liquid in the process for forming titanium dioxide by the sulphate route may be fed into the bed 34 through a conduit 39. In addition, the separator 24, when in operation, feeds a small quantity of solids into the conduit 38. After passage through the separator 24 the gas mixture leaving the outlet 22 of the chamber 2 passes into the conduit 26 and then enters the plenum chamber 28 of the fluidised bed reactor 30. The gas flow is effective to fluidise the particles of oxides and sulphates that are established as the bed materials. In view of the temperature of the gas mixture entering the chamber 28, further thermal cracking of the sulphate takes place. Typically, the gas mixture now incorporating an enhanced volume of sulphur dioxide and oxygen leaves the top of the bed 34 at a temperature of about 1,000° C. It passes out of the outlet 50 into the separator 52. Solids are separated from the gas in the separator 52 and returned to the bed 34 while the resultant gas mixture comprising sulphur dioxide, water vapour, carbon dioxide, oxygen and traces of sulphur trioxide typically passes to the precipitators, heat recovery unit and driers of a plant (not shown) for producing sulphuric acid from its sulphur dioxide content by the contact process.

In order to control the quantity of material in the bed 34, a portion of the solids leaving the separator 52 through the outlet 56 is typically discharged from the plant through an outlet 58 and, if desired, may be used in metallurgical processes.

In the event that there is not sufficient heat in the gases leaving the separator 24 to maintain an exit temperature of 1,000° C. above the fluidised bed 34 a temperture in excess of 1,000° C. is created at the outlet of the chamber 40 thereby enabling the temperature of the gas leaving the bed 34 to be maintained at or above 1,000° C.

Figure 2:
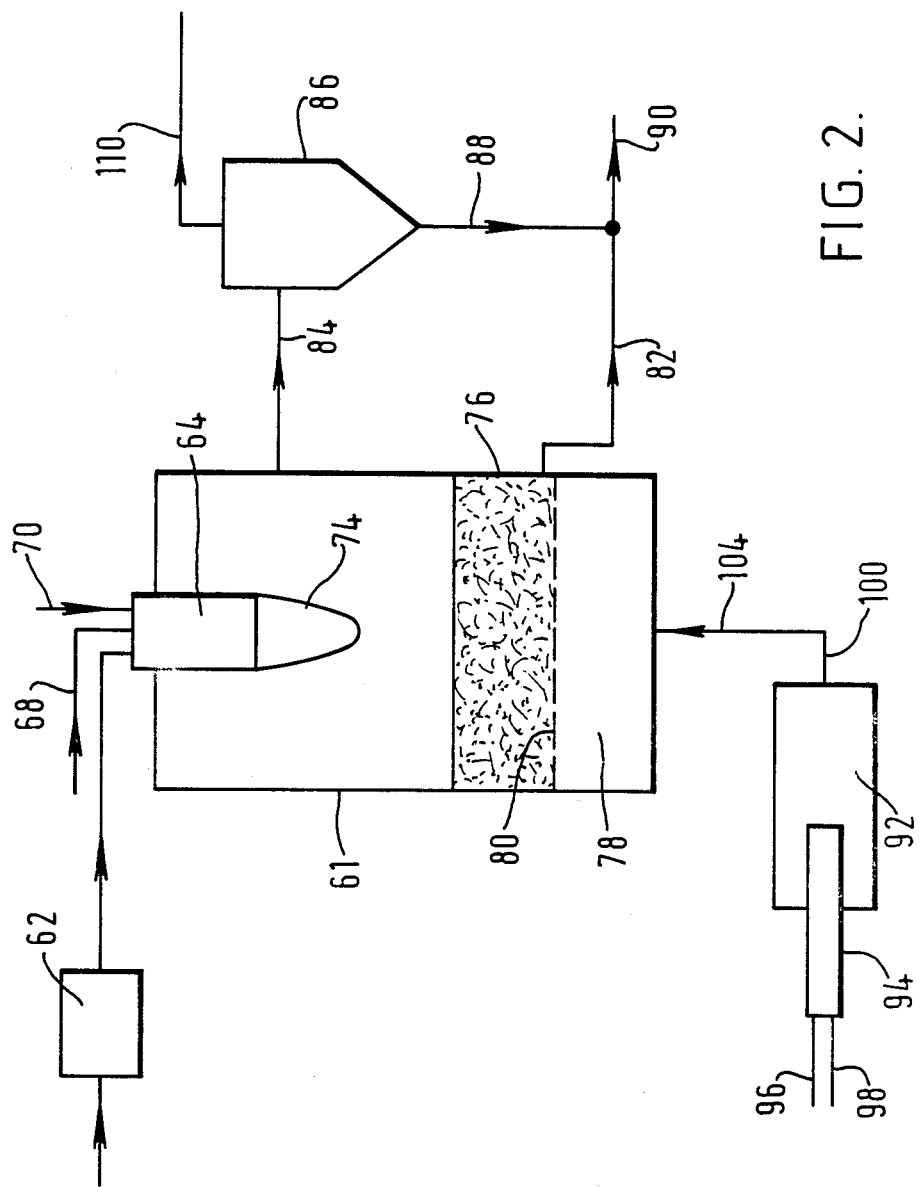

Referring now to FIG. 2 of the accompanying drawings, a stream of sulphate waste material from a process for manufacturing titanium dioxide from ilmenite by the sulphate route, typically comprising 70% by weight of water, 15% by weight of sulphuric acid and 15% by weight of inorganic sulphates, at least most of said inorganic sulphates comprising iron sulphate, is subjected to treatment in accordance with the invention. The stream is first passed through an evaporator 62 in which the water content of the stream is typically reduced to about 30% to 70% by weight of the stream. The evaporator 62 typically operates at a temperature in the order of 100° C. such that substantially no thermal cracking of the sulphate or evaporation of the acid takes place. Energy from the evaporator 62 may be recycled from a downstream part of the process so as to reduce the overall fuel requirements.

The concentrated stream exiting the evaporator 62 is passed to a first inlet 66 of a burner 64. The burner extends into a combustion chamber 61 which is disposed with its longitudinal axis vertical and has the burner 64 extending axially through its top. The burner 64 has a second inlet 68 for commercially pure oxygen and a third inlet 70 for gaseous or liquid hydrocarbon fuel.

In operation, a flame zone 74 is created by the burner. The flame zone 74 extends generally vertically downwards within the chamber 61 and ends above the lower cylindrical portion 76 of the chamber 2 in which in operation a residue of solid particles collects, the solid particles comprising inorganic oxide and sulphate issuing from the flame zone 74. The temperature generated in the flame zone 74 is sufficient to crack thermally most of the sulphate in the waste material. The resulting gaseous combustion products including sulphur dioxide, carbon dioxide and water vapour leave the chamber 61 through an outlet 84. At the very bottom of the chamber 61 there is a plenum chamber 78 whose top is defined by a grid 80. The solid residue collects on the grid 80. The chamber 61 has a first outlet 82 into which oxides substantially free of sulphate flow from the bed 78. The outlet 84 communicates with a cyclonic solid separator 86 having at its bottom an outlet 88 communicating with a pipeline 90 which also communicates with the outlet 82. In operation, waste solids are withdrawn from the plant through the pipeline 90.

The apparatus shown in FIG. 2 also includes an auxiliary combustion chamber 92 having a burner 94 disposed therein. The burner 94 has a first inlet 96 for fuel and a second inlet 98 for oxygen-enriched air. In operation, the combustion products from the burner 94, comprising carbon dioxide, nitrogen and water vapour (and sulphur dioxide if the fuel comprises sulphur) pass through an outlet 100 of the chamber 92 at a temperature in range of 1000° to 1300° C. which is controlled in a manner analogous to that described with reference to FIG. 1 and flow along a pipeline 104 into the plenum chamber 78. The velocity of the combustion products entering the plenum chamber 78 is typically selected so as to be able to fluidise or render turbulent the solid residue from the flame zone 74 of the burner 64. The temperature of the combustion products is in any case sufficient to complete the thermal cracking of the sulphate in the residue and the resulting gas mixture with the gaseous combustion products from the flame zone 74.

The separator 86 has an outlet for solids-free gas which communicates with the pipeline 110 leading to a plant not shown for purifying the gas mixture prior to the conversion of its sulphur dioxide content to sulphur trioxide and the subsequent absorption of the sulphur trioxide in relatively dilute sulphuric acid to form a more concentrated sulphuric acid product.

In operation of the apparatus shown in FIG. 2, the gas mixture leaving the outlet 84 of the chamber 61 typically has a temperature of about 1000° C. and typically contains up to about 25% by volume of sulphur dioxide.

I claim:

1. A method of recovering a gas mixture including sulphur dioxide from waste material comprising a sulfate, comprising burning fuel with an axial burner directed substantially downward to form a flame zone in a chamber, introducing sulphate waste material into the flame zone, employing pure oxygen or oxygen-enriched air to support combustion of the fuel and to generate a flame of sufficient temperature to crack solid sulfate waste material and thereby liberate sulphur dioxide therefrom, separating solids containing residual sulfate from the gaseous combustion products by collecting such solids from the chamber where they fall substantially vertically under gravity from the flame zone, and thermally cracking said residual sulfate in a region spaced from said chamber to liberate additional sulphur dioxide.

2. A method as claimed in claim 1, additionally including the step of pre-concentrating the sulphate waste material by evaporating part of its water content.

3. A method as claimed in claim 1, in which the thermal cracking proceeds at a temperature in the range of 900° to 1,300° C.

4. A method as claimed in claim 1, wherein the sulphate is iron sulphate.

5. A method as claimed in claim 1, additionally including the step of converting the sulphur dioxide to sulphur trioxide and absorbing the sulphur trioxide in an aqueous liquid to form sulphuric acid.

* * * * *